(12) United States Patent
Shimada et al.

(10) Patent No.: US 8,557,724 B2
(45) Date of Patent: Oct. 15, 2013

(54) SEMICONDUCTOR PORCELAIN COMPOSITION AND METHOD OF PRODUCING THE SAME

(75) Inventors: Takeshi Shimada, Osaka (JP); Koichi Terao, Osaka (JP); Kazuya Toji, Osaka (JP)

(73) Assignee: Hitachi Metals, Ltd., Tokyo (JP)

( * ) Notice: Subject to any disclaimer, the term of this patent is extended or adjusted under 35 U.S.C. 154(b) by 4 days.

(21) Appl. No.: 12/626,700

(22) Filed: Nov. 27, 2009

(65) Prior Publication Data

US 2010/0075825 A1    Mar. 25, 2010

Related U.S. Application Data

(62) Division of application No. 11/912,799, filed as application No. PCT/JP2006/309038 on Apr. 28, 2006, now Pat. No. 7,704,906.

(30) Foreign Application Priority Data

Apr. 28, 2005 (JP) ............... P. 2005-133610
Sep. 30, 2005 (JP) ............... P. 2005-289101

(51) Int. Cl.
- C04B 35/468 (2006.01)
- C04B 35/46 (2006.01)
- H01B 1/08 (2006.01)
- H01C 7/02 (2006.01)

(52) U.S. Cl.
USPC ........... 501/123; 501/134; 501/135; 501/136; 501/137; 501/138; 501/139; 423/263; 423/592.16; 423/617; 423/635; 423/641

(58) Field of Classification Search
USPC ............ 423/263, 592.16, 617, 641, 635; 501/134, 135, 136, 137, 123
See application file for complete search history.

(56) References Cited

U.S. PATENT DOCUMENTS

| | | | |
|---|---|---|---|
| 3,962,146 A * | 6/1976 | Matsuoka et al. | 252/519.12 |
| 4,014,822 A * | 3/1977 | Fujikawa | 252/520.2 |
| 4,956,320 A * | 9/1990 | Asakura et al. | 501/137 |
| 6,221,800 B1 | 4/2001 | Takahashi et al. | |

FOREIGN PATENT DOCUMENTS

| | | |
|---|---|---|
| JP | 50-58106 | 5/1975 |
| JP | 56-169301 | 12/1981 |
| JP | 2000016866 A * | 1/2000 |
| JP | 2005-22891 | 1/2005 |
| JP | 2005-255493 | 9/2005 |

OTHER PUBLICATIONS

English translation of Akashi (JP56-169301).*
Machine translation of Haruta (JP2000-016866).*
U.S. Appl. No. 11/912,799, filed Dec. 12, 2007, Takeshi Shimada et al., Hitachi Metals, Ltd.
English Translation of Search Report issued in International Patent Application No. PCT/JP2006/309038 on Jul. 4, 2006.
109 proceedings of Ceramics Material Committee of Society of Material Science 13-14 (2003).
J. Soc. Mat. Sci., Japan, vol. 54, 1155-1159 (2003).
Abicht (Journal of Materials Science 1991, 26:2337-2342).
MacCHESNEY (Journal of the American Ceramic Society 1965, 48(2):81-88.
European Search Report issued Sep. 26, 2011, in corresponding European Application No. 06745897.6.
Database WPI, Week 198206, Thomson Scientific, London, GB; AN 1982-10914E, XP000002658701.

* cited by examiner

Primary Examiner — Jun Li
(74) Attorney, Agent, or Firm — Stein IP, LLC

(57) ABSTRACT

A semiconductor porcelain composition is prepared by separately preparing a composition of $(BaR)TiO_3$ (R is La, Dy, Eu, Gd or Y) and a composition of $(BiNa)TiO_3$, and calcining the composition of $(BaR)TiO_3$ at a temperature of 900° C. through 1300° C. and calcining the composition of $(BiNa)TiO_3$ at a temperature of 700° C. through 950° C., and then mixing, forming and sintering the calcined powders. Similarly, a semiconductor porcelain composition is prepared by separately preparing a composition of $(BaM)TiO_3$ (M is Nb, Ta or Sb) and a composition of $(BiNa)TiO_3$, and calcining the composition of $(BaM)TiO_3$ at a temperature of 900° C. through 1300° C. and calcining the composition of $(BiNa)TiO_3$ at a temperature of 700° C. through 950° C., and then mixing, forming and sintering the calcined powders.

1 Claim, 2 Drawing Sheets

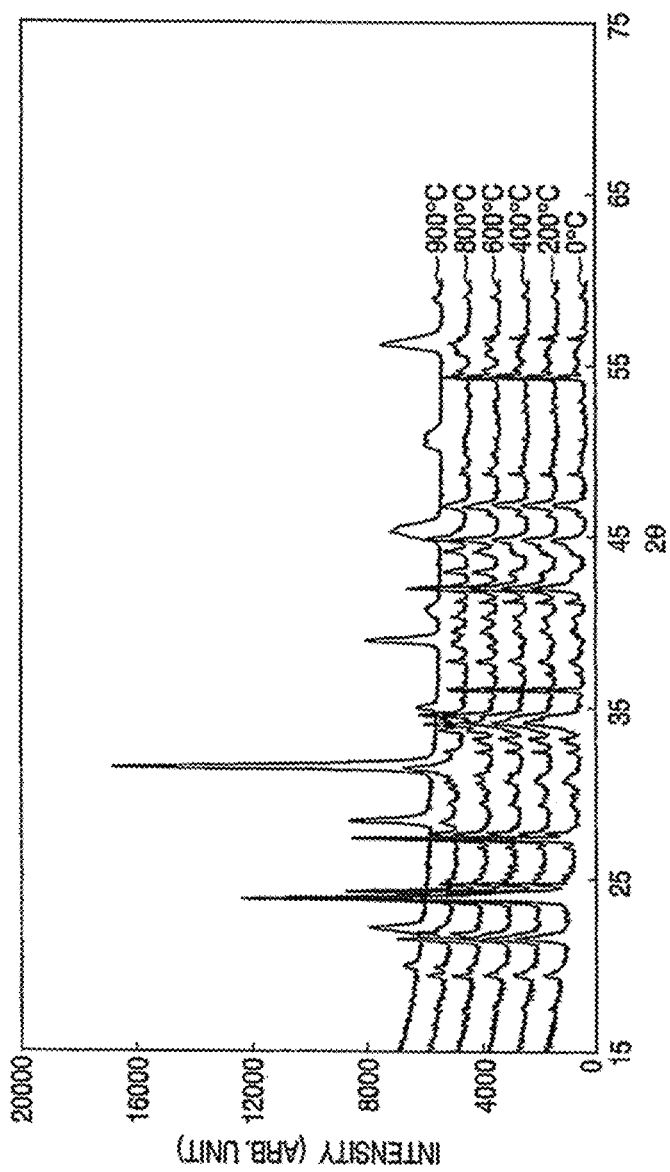

SEMICONDUCTOR PORCELAIN COMPOSITION AND METHOD OF PRODUCING THE SAME

CROSS-REFERENCE TO RELATED APPLICATIONS

This application is a divisional of U.S. patent application Ser. No. 11/912,799, filed on Dec. 12, 2007 now U.S. Pat. No. 7,704,906, which claims the benefit of PCT International Patent Application No. PCT/JP2006/309038 filed Apr. 28, 2006, Japanese Patent Application No. 2005-289101 filed Sep. 30, 2005, and Japanese Patent Application No. 2005-133610 filed Apr. 28, 2005, in the Japanese Patent Office, the disclosures of which are incorporated herein by reference.

BACKGROUND OF THE INVENTION

1. Field of the Invention

The present invention relates to a semiconductor porcelain composition for use in a PTC thermistor, a PTC heater, a PTC switch, a temperature detector or the like, which has a positive temperature coefficient of resistivity; and a method for producing the same.

2. Description of the Related Art

Conventionally, as materials showing a PTCR characteristic (Positive Temperature Coefficient of Resistivity), there have been proposed compositions in which various semiconductive dopants are added to $BaTiO_3$. These compositions have Curie temperatures around 120° C. Depending on the use, these composition need to be shifted in the Curie temperatures.

For example, although it has been proposed to shift Curie temperature by adding $SrTiO_3$ to $BaTiO_3$, in this case, the Curie temperature is shifted only in a negative direction and is not shifted in a positive direction. Currently, only $PbTiO_3$ is known as an adding element for shifting Curie temperature in a positive direction. However, $PbTiO_3$ includes an element for bringing about environmental pollution, and therefore, in recent years, a material which does not use $PbTiO_3$ has been desired.

In a $BaTiO_3$ semiconductor porcelain, with an object of preventing a reduction in a temperature coefficient of resistivity by Pb substitution, as well as reducing a voltage dependency and promoting a productivity or a reliability, there has been proposed a method of producing a $BaTiO_3$ semiconductor porcelain in which a composition, not using $PbTiO_3$ and obtained by adding one or more kinds of any of Nb, Ta and a rare earth element to a composition in which x in $Ba_{1-2x}(BiNa)_xTiO_3$ where a portion of Ba of $BaTiO_3$ is substituted by Bi—Na is controlled to a range of $0<x\leq0.15$, is sintered in nitrogen, and thereafter subjected to a heat treatment in a reducing atmosphere (see Patent Reference 1).

Patent Reference 1: JP-A-56-169301

SUMMARY OF THE INVENTION

Patent Reference 1 discloses that, as an embodiment, all of elements constituting the composition, such as $BaCO_3$, $TiO_2$, $Bi_2O_3$, $Na_2O_3$ and PbO which serve as starting raw materials, are mixed before calcination and then subjected to calcination, forming, sintering and heat treatment.

However, in a composition in which a portion of Ba of $BaTiO_3$ is substituted by Bi—Na, when all the elements constituting the composition are mixed before calcination as in Patent Reference 1, there poses a problem that Bi is evaporated to generate a compositional shift of Bi—Na, whereby formation of secondary phases is promoted, a resistivity at room temperature is elevated, and a scattering in the Curie temperature is brought about.

Although it is conceivable to calcine the elements at a low temperature in order to inhibit evaporation of Bi, there poses a problem that, although evaporation of Bi is inhibited, a complete solid solution cannot be formed, and a desired characteristic cannot be achieved.

On the other hand, in a $BaTiO_3$ other materials systems, when the material is treated such that a resistivity at room temperature is reduced as in sintering in a reducing atmosphere, there poses a problem that a temperature coefficient of resistivity (jump characteristic) is reduced (see Nonpatent References 1 and 2). When the temperature coefficient of resistivity is reduced, there poses a problem that switching does not occur at a target temperature. In order to resolve the problems, in Nonpatent References 1 and 2, the temperature coefficient of resistivity is improved by carrying out a heat treatment in the atmosphere (in air).

Nonpatent Reference 1: 109 proceeding of Ceramics Material Committee of Society of Material Science 13-14 (2003)

Nonpatent Reference 2: J. Soc. Mat. Sci., Japan, Vol 52, 1155-1159 (2003)

Even in the $Ba_{1-2x}(BiNa)_xTiO_3$ material according to Patent Reference 1, when the material is treated, for example sintered in the reducing atmosphere, such that the resistivity at room temperature is reduced, the temperature coefficient of resistivity tends to be reduced. However, in the case of $Ba_{1-2x}(BiNa)_xTiO_3$ material, when the heat treatment is carried out in the atmosphere, the resistivity at room temperature tends to be elevated, and the heat treatment condition of the $BaTiO_3$ material is not applicable as it is.

An object of the invention is to provide a semiconductor porcelain composition capable of shifting a Curie temperature in a positive direction without using Pb and considerably reducing a resistivity at room temperature, and a method of producing the same.

Further, it is another object of the invention to provide a semiconductor porcelain composition in which a portion of Ba of $BaTiO_3$ is substituted by Bi—Na, which is capable of inhibiting evaporation of Bi in a calcining step, inhibiting the formation of secondary phases by preventing a compositional shift of Bi—Na, further reducing a resistivity at room temperature, and inhibiting a scattering in a Curie temperature, and a method of producing the same.

Further, it is still another object of the invention to provide a semiconductor porcelain composition in which a portion of $BaTiO_3$ is substituted by Bi—Na, which is capable of promoting a temperature coefficient of resistivity at a high temperature region (Curie temperature or higher) while maintaining a resistivity at room temperature to be low without carrying out a heat treatment or the like in the atmosphere, and a method of producing the same.

In order to achieve the above-described objects, as a result of an intensive research, the inventors have found that in producing a semiconductor porcelain composition in which Ba of $BaTiO_3$ is substituted by Bi—Na, by separately preparing a composition of $(BaQ)TiO_3$ (Q is a semiconductive dopant) and a composition of $(BiNa)TiO_3$, and calcining the composition of $(BaQ)TiO_3$ at a comparatively high temperature and calcining the composition of $(BiNa)TiO_3$ at a comparatively low temperature to thereby calcine the compositions at their respective optimum temperatures, evaporation of Bi in the composition of $(BiNa)TiO_3$ can be inhibited, formation of secondary phases can be inhibited by preventing a compositional shift of Bi—Na; and by mixing, forming and sintering the calcined powders, a semiconductor porcelain composition having a small resistivity at room temperature and being inhibited from a scattering in the Curie temperature can be provided.

Further, the inventors tried to sinter the semiconductor porcelain composition in which a portion of Ba of $BaTiO_3$ is substituted by Bi—Na in an inert gas atmosphere in order to suppress the resistivity at room temperature to be low, and have found that the temperature coefficient of resistivity (jump characteristic) is varied by a sintering temperature, a sintering period, a sintering atmosphere, a size of a sample or the like. Hence, after a further intensive research, the inventors have found that the longer the sintering period, the more the resisitivity at room temperature and the temperature coefficient of resistivity are reduced, and even when the sintering period is prolonged, the temperature coefficient of resistivity is promoted by controlling a cooling rate after sintering. Consequently, the inventors have found that the temperature coefficient of resistivity can be promoted in a high temperature region (Curie temperature or higher) while maintaining the resistivity at room temperature to be low without carrying out heat treatment in the atmosphere after sintering as in the $BaTiO_3$ material.

That is, the invention relates to a method of producing a semiconductor porcelain composition in which a portion of Ba of $BaTiO_3$ is substituted by Bi—Na, the method comprising a step of preparing a calcined powder of $(BaQ)TiO_3$ (wherein Q is a semiconductive dopant), a step of preparing a calcined powder of $(BiNa)TiO_3$, a step of mixing the calcined powder of $(BaQ)TiO_3$ and the calcined powder of $(BiNa)TiO_3$, and a step of forming and sintering a mixed calcined powder.

According to the invention, there can be provided a semiconductor porcelain composition which is capable of shifting the Curie temperature without using Pb which brings about an environmental pollution, and has a considerably reduced resistivity at room temperature.

According to the invention, there can be provided a semiconductor porcelain composition in which evaporation of Bi in the calcining step is inhibited, formation of secondary phases containing Na is inhibited by preventing a compositional shift of Bi—Na, the resistivity at room temperature is further reduced, and a scattering in the Curie temperature is inhibited.

According to the invention, there can be provided a semiconductor porcelain composition in which the temperature coefficient of resistivity at a high temperature region (Curie temperature or higher) is improved while maintaining the resistivity at room temperature to be low without carrying out a heat treatment in the atmosphere or the like after sintering.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 is a diagram showing X-ray diffraction patterns at respective calcination temperatures of a semiconductor porcelain composition according to a comparative example.

DETAILED DESCRIPTION OF THE EMBODIMENTS

Figure 1:
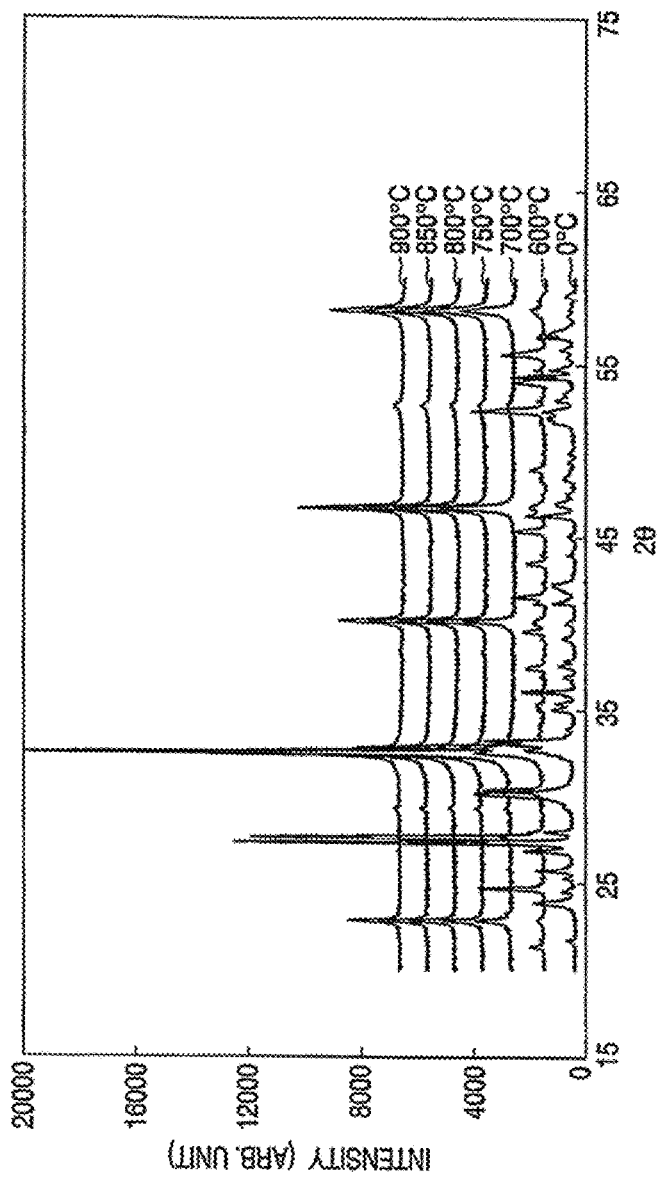
FIG. 1 is a diagram showing X-ray diffraction patterns at respective calcination temperatures of a semiconductor porcelain composition according to the invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In the step of preparing a calcined powder of $(BaQ)TiO_3$ (Q is a semiconductive dopant) according to the invention, first, raw material powders of $BaCO_3$, $TiO_2$ and a semiconductive dopant such as $La_2O_3$ or $Nb_2O_5$ are mixed to make a mixed raw material powder to be calcined. It is preferable that a calcination temperature falls in a range of 900° C. through 1300° C. and it is preferable that the calcining period is equal to or longer than 0.5 hour. When the calcination temperature is less than 900° C. or the calcining period is less than 0.5 hour, $(BaQ)TiO_3$ is not completely formed, unreacted BaO reacts with water in an atmosphere and a mixing medium to cause a compositional shift, and therefore, it is not preferable. Further, when the calcination temperature exceeds 1300° C., a sintered body is produced in a calcined powder to hamper a solid solution to be formed with a calcined powder of $(BiNa)TiO_3$ to be mixed later.

In the step of preparing a calcined powder of $(BiNa)TiO_3$ according to the invention, first, $NaCO_3$, $Bi_2O_3$ and $TiO_2$ constituting a raw material powder are mixed to make a mixed raw powder to be calcined. It is preferable that the calcination temperature falls in a range of 700° C. through 950° C. and it is preferable that the calcining period is 0.5 hour through 10 hours. When the calcination temperature is less than 700° C. or the calcining period is less than 0.5 hour, unreacted NaO reacts with water in an atmosphere or, in a case of wet mixture, with a solvent thereof to bring about a compositional shift or a scattering in a characteristic, and therefore, it is not preferable. Evaporation of Bi is progressed, a compositional shift is brought about, and formation of secondary phases is promoted when the calcination temperature exceeds 950° C. or when the calcining period exceeds 10 hours, and therefore, it is not preferable.

In this regard, it is preferable to select optimum temperatures for the preferable calcination temperature (900° C. through 1300° C.) in the step of preparing the calcined powder of $(BaQ)TiO_3$ and the preferable calcination temperature (700° C. through 950° C.) in the step of preparing the calcined powder of $(BiNa)TiO_3$ pertinently in accordance with a use or the like. For example, with regard to the calcination temperature of $(BiNa)TiO_3$, in order to sufficiently carry out a reaction while inhibiting evaporation of Bi, it is preferable to carry out the reaction at a comparatively low temperature by adjusting the calcining period or the like. Further, it is preferable to set the calcination temperature of $(BiNa)TiO_3$ to be lower than the calcination temperature of $(BaQ)TiO_3$.

It is a main characteristic of the invention to separately carry out the step of preparing the calcined powder of $(BaQ)TiO_3$ (Q is a semiconductive dopant) and the step of preparing the calcined powder of $(BiNa)TiO_3$, and whereby, there can be provided a semiconductor porcelain composition in which evaporation of Bi of $(BiNa)TiO_3$ in the calcining step is inhibited, formation of secondary phases is inhibited by preventing a compositional shift of Bi—Na, a resistivity at room temperature is further reduced and a scattering in the Curie temperature is inhibited.

In the steps of preparing the respective calcined powders, in the course of mixing the raw material powders, crushing may be carried out in accordance with grain sizes of the raw material powders. Further, although mixing and crushing is either of wet type mixing and crushing in which pure water or ethanol is used or dry type mixing and crushing, in the case where the dry type mixing and crushing is carried out, a compositional shift can be further prevented, and therefore it is preferable. In the above, although $BaCO_3$, $Na_2CO_3$, $TiO_2$ and the like are exemplified as the raw material powders, the effect of the invention is not deteriorated even when other Ba compound, Na compound or the like is used.

The calcined powder of $(BaQ)TiO_3$ and the calcined powder of $(BiNa)TiO_3$ are prepared separately as described above, and the respective calcined powders are then blended to a predetermined amount and subsequently mixed. Although mixing may be either of wet type mixing in which pure water or ethanol is used or dry type mixing, in the case where the dry type mixing is carried out, a compositional shift can be further prevented, and therefore it is preferable. Further, in accordance with a grain size of a calcined powder, crushing after mixing may be carried out, or mixing and crushing may simultaneously be carried out. It is preferable that a mean grain size of a mixed calcined powder after mixing and crushing falls in a range of 0.6 μm through 1.5 μm.

In the step of preparing the calcined powder of $(BaQ)TiO_3$ and/or the step of preparing the calcined powder of $(BiNa)TiO_3$, or the step of mixing the respective calcined powders, it is preferable to add 3.0 mol % or less of Si oxide, and 4.0 mol % or less of Ca carbonate or Ca oxide, since the Si oxide can inhibit abnormal growth of a crystal grain and facilitate to control the resistivity, and Ca carbonate or Ca oxide can promote a sintering performance at a low temperature. In either case, when added to exceed the limited amounts, the composition does not show semiconductor formation, and therefore, it is not preferable. It is preferable to carry out the addition before mixing in the respective steps.

The semiconductor porcelain composition according to the invention can be prepared by forming and sintering the mixed calcined powders provided by the steps of mixing the calcined powder of $(BaQ)TiO_3$ and the calcined powder of $(BiNa)TiO_3$. Although an example of preferable steps at and after the calcined powder mixing step will be exemplified as follows, the invention is not limited thereto but all the known methods can be adopted.

The mixed calcined powder prepared by the step of mixing the calcined powder of $(BaQ)TiO_3$ and the calcined powder of $(BiNa)TiO_3$ is formed by desired forming means. A crushed powder may be optionally granulated by a granulating apparatus before forming. It is preferable that a green compact density after forming is 2 through 3 g/cm³.

Sintering can be carried out at a sintering temperature of 1200° C. through 1400° C., for sintering period of 2 hours through 6 hours in the atmosphere, in a reducing atmosphere or in an inert gas atmosphere having a low oxygen concentration, and it is a preferable example to adopt the sintering step shown below constituting one of characteristics of the invention. Further, when granulation is carried out before forming, it is preferable to carry out a processing of removing a binder at 300° C. through 700° C. before sintering.

A sintering step is carried out at a sintering temperature of 1290° C. through 1350° C. in an atmosphere having an oxygen concentration of less than 1% for (1) sintering period of less than 4 hours, or (2) sintering period satisfying equation: $\Delta T \leq 25 t$ (t=sintering time (hr), $\Delta T$=cooling rate after sintering (° C./hr)), and cooling after sintering is successively carried out at the cooling rate satisfying the above equation.

Even when either of the sintering steps is carried out, that is, the sintering period is shortened or the sintering period is prolonged but rapid cooling is carried out at the pertinent rapid cooling rate in accordance with the sintering period, there can be provided a semiconductor porcelain composition having a promoted temperature coefficient of resistivity at a high temperature region (Curie temperature or higher) while maintaining the resistivity at room temperature to be low, without carrying out a heat treatment in the atmosphere which is carried out in the case of $BaTiO_3$ material.

In the above-described sintering step, the atmosphere having an oxygen concentration of less than 1% refers to a vacuum or inert gas atmosphere having an oxygen concentration of less than 1%. Preferably, it is preferable to carry out the sintering step in an inert gas atmosphere, for example, in an atmosphere of nitrogen gas, or argon gas. Further, although the above-described atmosphere is preferable also for an atmosphere in cooling, but the atmosphere may not necessarily be such an atmosphere.

In the above-described sintering step, when the method of (1) is executed, a cooling condition after sintering can arbitrarily be selected. On the other hand, when the method of (2) is executed, the cooling rate $\Delta T$ (° C./hr) is determined by a length of the sintering period t. For example, when the sintering period t is an hour, the cooling rate $\Delta T$ becomes 25×1=25° C./hr or higher, and when the sintering period t is 4 hours, the cooling rate $\Delta T$ becomes 25×4=100° C./hr or higher. That is, when the sintering period t is prolonged, the cooling rate $\Delta T$ is accelerated in accordance with the sintering period. Although this method is effective when the sintering period t is prolonged, the method is applicable even when the sintering period t is short (for example, less than 4 hours).

In the semiconductor porcelain composition which is the object of the invention, Bi—Na substitutes for a portion of Ba of $BaTiO_3$, and the composition is provided by separately carrying out the step of preparing the calcined powder of $(BaQ)TiO_3$ (Q is a semiconductive dopant) and the step of preparing the calcined powder of $(BiNa)TiO_3$ and then mixing them, followed by forming and sintering, as described above.

The composition in which a portion of $BaTiO_3$ is substituted by Bi—Na becomes a semiconductor porcelain composition by adding the semiconductive dopant and carrying out a valence control. According to the invention, the semiconductive dopant is added to $BaTiO_3$ to constitute the calcined powder of $(BaQ)TiO_3$ (Q is a semiconductive dopant).

As the semiconductive dopant Q, R(R is at least one kind selected from La, Dy, Eu, Gd and Y) or M (M is at least one kind selected from Nb, Ta and Sb) is preferred. When R(R is at least one kind selected from La, Dy, Eu, Gd and Y) is used as the semiconductive dopant Q, the semiconductor porcelain composition obtained has a composition formula expressed as $[(BiNa)_x(Ba_{1-y}R_y)_{1-x}]TiO_3$, in which x and y each satisfy $0<x\leq0.2$ and $0<y\leq0.02$.

On the other hand, when M (M is at least one kind selected from Nb, Ta and Sb) is used as the semiconductive dopant Q, the semiconductor porcelain composition obtained has a composition formula expressed as $[(BiNa)_xBa_{1-x}][Ti_{1-z}M_z]O_3$, in which x and z each satisfy $0<x\leq0.2$ and $0<z\leq0.005$. Even when R is used or even when M is used as the semiconductive dopant Q, either of them is invariably the composition in which a portion of $BaTiO_3$ is substituted by Bi—Na.

Detailed descriptions of the two compositions of $[(BiNa)_x(Ba_{1-y}R_y)_{1-x}]TiO_3$ and $[(BiNa)_xBa_{1-x}][Ti_{1-z}M_z]O_3$ are as follows.

In the composition of $[(BiNa)_x(Ba_{1-y}R_y)_{1-x}]TiO_3$, R is at least one kind selected from La, Dy, Eu, Gd and Y, and La is preferable among them. In the composition formula, x designates a content ratio of Bi+Na and a preferable range thereof is $0<x\leq0.2$. When x is 0, the Curie temperature cannot be shifted to a high temperature side, while when x exceeds 0.2, the resistivity at room temperature becomes $10^4$ Ωcm and it is difficult to apply to a PTC heater or the like. Therefore, these cases are not preferable.

Further, in the composition formula, y designates a content ratio of R and a preferable range thereof is $0<y\leq0.02$. When y is 0, the composition is not made into a semiconductor, while when y exceeds 0.02, the resistivity at room temperature is increased. Therefore, these cases are not preferable. Although the valence control is carried out by changing a value of y, in a composition in which a portion of Ba is substituted by Bi—Na, when the valence control of the composition is carried out, there poses a problem that when a positive ion of valence 3 is added as the semiconductive dopant, an effect of semiconductor formation is reduced by the presence of Na ion of valence 1 and the resistivity at room temperature is increased. Therefore, a further preferable range is $0.002\leq y\leq0.02$. Herein, $0.002\leq y\leq0.02$ corresponds to 0.02 mol % through 2.0 mol % in mol % designation. Incidentally, in Patent Reference 1 mentioned above, although 0.1 mol % of $Nd_2O_3$ is added as a semiconductive dopant, it seems that sufficient semiconductor formation to be used as PTC cannot be realized thereby.

In $[(BiNa)_xBa_{1-x}][Ti_{1-z}M_z]O_3$ composition, M is at least one kind selected from Nb, Ta and Sb, and Nb is preferable among them. In the composition formula, x shows a content ratio of Bi+Na and a preferable range thereof is $0<x\leq0.2$. When x is 0, the Curie temperature cannot be shifted to a high temperature side, while when x exceeds 0.2, the resistivity at room temperature becomes near to $10^4$ Ωcm and it is difficult to apply to a PTC heater or the like. Therefore, these cases are not preferable.

Further, in the composition formula, z designates a content ratio of M and a preferable range thereof is $0<z\leq0.005$. When z is 0, the valence control cannot be carried out and the composition is not made into a semiconductor, while when z exceeds 0.005, the resistivity at room temperature exceeds $10^3$ Ωcm. Therefore, these cases are not preferable. Herein, $0<z\leq0.005$ corresponds to 0 through 0.5 mol % (which does not include 0) in mol % designation.

In the case of $[(BiNa)_xBa_{1-x}][Ti_{1-z}M_z]O_3$ composition, in order to carry out the valence control, M element substitute for Ti. In this case, since the addition of M element (additional amount $0<z\leq0.005$) constitutes an object thereof by a valence control of Ti site constituting an element of valence 4, the valence control can be carried out by an amount smaller than a preferable additional amount ($0.002\leq y\leq0.02$) of R element in $[(BiNa)_x(Ba_{1-y}R_y)_{1-x}]TiO_3$ composition using R as the semiconductive dopant to achieve an advantage capable of alleviating an inner strain of the semiconductor porcelain composition according to the invention.

In the two compositions of $[(BiNa)_x(Ba_{1-y}R_y)_{1-x}]TiO_3$ and $[(BiNa)_xBa_{1-x}][Ti_{1-z}M_z]O_3$, it is preferable that Bi and Na is 1:1, that is, the composition formulae preferably be $[(Bi_{0.5}Na_{0.5})_x(Ba_{1-y}R_y)_{1-x}]TiO_3$ and $[(Bi_{0.5}Na_{0.5})_xBa_{1-x}][Ti_{1-z}M_z]O_3$. However, as described also in the background art section, when all the elements constituting the composition are mixed before being calcined, in the calcining step, Bi is evaporated to bring about a compositional shift of Bi—Na, whereby there poses problems that the formation of secondary phases is promoted, the resistivity at room temperature is increased, and a scattering is brought about in the Curie temperature.

According to the invention, by separately calcining (BaQ)$TiO_3$ composition and (BiNa)$TiO_3$ composition at the respective optimum temperatures, a ratio of Bi to Na can be controlled to Bi/Na=0.78 through 1, the resistivity at room temperature can be further reduced, and the scattering in the Curie temperature can be inhibited. When Bi/Na exceeds 1, Bi which is not related to formation of (BiNa)$TiO_3$ remains in the material and secondary phases are liable to be formed in sintering, whereby the resistivity at room temperature is increased, while when it is less than 0.78, secondary phases are liable to be formed at a sintering stage, whereby the resistivity at room temperature is increased. Therefore, these cases are not preferable.

By the above-described production method, there can be provided the semiconductor porcelain composition having a composition formula expressed as $[(BiNa)_x(Ba_{1-y}R_y)_{1-x}]TiO_3$, (R is at least one kind selected from La, Dy, Eu, Gd and Y) in which x and y each satisfy $0<x\leq0.2$ and $0<y\leq0.02$, and in which a ratio of Bi to Na satisfies a relationship of Bi/Na=0.78 through 1; or the semiconductor porcelain composition having a composition formula expressed as $[(BiNa)_xBa_{1-x}][Ti_{1-z}M_z]O_3$ (M is at least one kind selected from Nb, Ta and Sb) in which x and z each satisfy $0<x\leq0.2$ and $0<z\leq0.005$, and in which a ratio of Bi to Na satisfies a relationship of Bi/Na=0.78 through 1. These semiconductor porcelain compositions possess the effects of shifting the Curie temperature without using Pb which brings about environmental contamination and considerably reducing the resistivity at room temperature.

EXAMPLES

Example 1

$BaCO_3$ and $TiO_2$ as the main raw materials, and a raw material powder of $La_2O_3$ as the semiconductive dopant were prepared and blended to satisfy $(Ba_{0.994}La_{0.006})TiO_3$. Furthermore, 0.3 mol % of $SiO_2$ and 1.2 mol % of $CaCO_3$ were added as sintering assisting agents, and they were mixed in ethanol. The mixed raw material powder thus obtained was calcined at 1000° C. for 4 hours to prepare a calcined powder of (BaLa)$TiO_3$.

Material powders of $NaCO_3$, $Bi_2O_3$ and $TiO_2$ were prepared and blended to satisfy $(Bi_{0.5}Na_{0.5})TiO_3$. Furthermore, 0.08 mol % of $SiO_2$ and 0.27 mol % of CaO were added as sintering assisting agents, and the resultant matters were mixed in the atmosphere (dry type) or in ethanol (wet type). The mixed raw material powder thus obtained was calcined at 600° C. through 900° C. for 4 hours in the atmosphere to prepare a calcined powder of (BiNa)$TiO_3$. FIG. 1 shows X-ray diffraction patterns of the obtained calcined powder of $(Bi_{0.5}Na_{0.5})TiO_3$ at respective calcination temperatures of 600° C. through 900° C.

The calcined powder of (BaLa)$TiO_3$ and the calcined powder of (BiNa)$TiO_3$ described above were blended to satisfy $[(Bi_{0.5}Na_{0.5})_{0.1}(Ba_{0.994}La_{0.006})_{0.9}]TiO_3$, and then they were mixed, crushed, and then dried by a pot mill using ethanol as a medium until the mixed calcined powder became to have a size of 0.9 μm. A crushed powder of the mixed calcined powder was added and mixed with PVA, and thereafter, granulated by a granulating apparatus. After the granulated powder thus obtained was formed by a uniaxial press apparatus and the green compact was removed of a binder at 500°

C., sintering at sintering temperature of 1320° C. for 4 hours in the atmosphere was carried out to thereby obtain a sintered body. Table 1 shows the results of a content analysis of Na amount and Bi amount of the sintered body thus obtained. In the table, Bi amount is a value converted in terms of the Na amount as 100. Further, a mixing method in Table 1 is a mixing method of $(Bi_{0.5}Na_{0.5})TiO_3$.

Comparative Example 1

$BaCO_3$ and $TiO_2$ as main raw materials, $La_2O_3$ as semiconductive dopant, and $NaCO_3$, $Bi_2O_3$ and $TiO_2$ as shifters of the Curie temperature were prepared and all the elements constituting the composition were blended from the beginning to satisfy $[(Bi_{0.5}Na_{0.5})_{0.1}(Ba_{0.994}La_{0.006})_{0.9}]TiO_3$. Furthermore, 0.4 mol % of $SiO_2$ and 1.4 mol % of $CaCO_3$ were added as sintering assisting agents, and they were mixed in ethanol (wet type). The mixed raw material powder thus obtained was calcined at 200° C. through 1200° C. for 4 hours in nitrogen to obtain a calcined powder. FIG. 2 shows X-ray diffraction patterns of the obtained calcined powder of $[(Bi_{0.5}Na_{0.5})_{0.1}(Ba_{0.994}La_{0.006})_{0.9}]TiO_3$ at respective calcination temperatures of 200° C. through 900° C.

The calcined powder thus obtained was added and mixed with PVA, and then granulated by the granulating apparatus. After the granulated powder thus obtained was formed by a uniaxial press apparatus and the green compact was removed of the binder at 500° C., sintering at sintering temperature of 1320° C. for 4 hours was carried out in the atmosphere to obtain a sintered body. Table 1 shows the results of a content analysis of Na amount and Bi amount of the sintered body thus obtained. Further, Bi amount is a value converted in terms of the Na amount as 100.

As is apparent from FIG. 1 and FIG. 2, the calcined powder of (BiNa)$TiO_3$ according to Example 1 becomes completely a single phase at 700° C. On the other hand, when all the elements constituting the composition were blended from the beginning, the elements did not give a solid solution completely unless the temperature is at 900° C. or higher, and it can be seen that the sufficient calcined powder was not obtained.

Furthermore, as is apparent from Table 1, according to the calcined powder of (BiNa)$TiO_3$ according to Example 1, the evaporation amount of Bi was small at respective calcination temperatures and Bi was hardly evaporated even at a temperature (700° C.) of forming a complete solid solution. Furthermore, it can be seen that evaporation of Bi was inhibited by mixing in a dry state. On the other hand, according to the calcined powder blended with all the elements constituting the composition from the beginning, it can be seen that the amount of evaporating Bi is larger than that of Example 1, and at 900° C. of forming a solid solution, a large amount of Bi had already been evaporated.

Example 2

$BaCO_3$ and $TiO_2$ as main raw materials, and a raw material powder of $La_2O_3$ as semiconductive dopant were prepared and blended to satisfy $(Ba_{0.994}La_{0.006})TiO_3$. Furthermore, 0.3 mol % of $SiO_2$ and 1.2 mol % of $CaCO_3$ were added as sintering assisting agents, and they were mixed in ethanol. The mixed raw material powder thus obtained was calcined at 1000° C. for 4 hours to prepare a calcined powder of (BaLa)$TiO_3$.

Raw material powders of $NaCO_3$, $Bi_2O_3$ and $TiO_2$ were prepared and blended to satisfy $(Bi_{0.5}Na_{0.5})TiO_3$. Then, 0.08 mol % of $SiO_2$ and 0.27 mol % of $CaSO_3$ were added as sintering assisting agents, and the resultant matters were mixed in the atmosphere or in ethanol. The mixed raw material powder thus obtained was calcined at 650° C. through 1000° C. for 4 hours to prepare a calcined powder of (BaNa)$TiO_3$.

The calcined powder of (BaLa)$TiO_3$ and the calcined powder of (BiNa)$TiO_3$ were blended to satisfy $[(Bi_{0.5}Na_{0.5})_{0.1}(Ba_{0.994}La_{0.006})_{0.9}]TiO_3$, and then they were mixed, crushed, and then dried by a pot mill using ethanol as a medium until a mixed calcined powder became to have a size of 0.9 μm. A crushed powder of the mixed calcined powder was added and mixed with PVA, and thereafter, granulated by the granulating apparatus. After the granulated powder thus obtained was formed by a uniaxial press apparatus and the green compact was removed of a binder at 500° C., sintering at sintering temperatures of 1290° C., 1320° C., or 1350° C. in the atmosphere was carried out to obtain a sintered body.

The sintered body thus obtained was worked into a shape of a plate having a size of 10 mm×10 mm×1 mm to produce a test piece, and temperature changes of resistance values of the respective test pieces in the range of from room temperature to 270° C. were measured by a resistance measuring instrument. The results of the measurement are shown in Table 2. Furthermore, a content analysis of Bi and Na was carried out to calculate a ratio of Bi/Na. The results thereof are shown in Table 2. Herein, sample No. 6 in Table 1 was mixed in the atmosphere in the step of preparing the calcined powder of (BiNa)$TiO_3$ and others were mixed in ethanol. Sample No. 5 was obtained with a sintering period of 2 hours. Sample No. 11 was added with $Bi_2O_3$ excessively in the course of blending. Further, those attached with * mark at a side of sample No. are comparative examples.

Comparative Example 2

$BaCO_3$ and $TiO_2$ as main raw materials, $La_2O_3$ as semiconductive dopant, and $NaCO_3$, $Bi_2O_3$ and $TiO_2$ as shifters of the Curie temperature were prepared, and all the elements constituting the composition were blended from the beginning to satisfy $[(Bi_{0.5}Na_{0.5})_{0.1}(Ba_{0.994}La_{0.006})_{0.9}]TiO_3$. Furthermore, 0.4 mol % of $SiO_2$, and 1.4 mol % of $CaCO_3$ were added as sintering assisting agents, and they were mixed in ethanol. Thereafter, the raw material mixed powder was calcined at 1000° C. for 4 hours in the atmosphere.

The calcined powder thus obtained was mixed, crushed and then dried by a pot mill using ethanol as a medium until the calcined powder became to have a size of 0.9 μm. The crushed powder was added and mixed with PVA, and then granulated by the granulating apparatus. After the granulated powder thus obtained was formed by a uniaxial press apparatus and the green compact thus obtained was removed of a binder at 500° C., sintering at sintering temperatures of 1290° C., 1320° C., or 1350° C. for 4 hours was carried out to obtain a sintered body.

The sintered body thus obtained was worked into a shape of a plate having a size of 10 mm×10 mm×1 mm to produce a test piece, and temperature changes of resistance values of the respective test pieces in the range of from room temperature to 270° C. were measured by a resistance measuring instrument. The results of measurement are shown in Table 3. Furthermore, a content analysis of Bi and Na was carried out to calculate a ratio of Bi/Na. The results thereof are shown in Table 3.

As is apparent from Table 2 and Table 3, it can be seen that according to the semiconductor porcelain composition of the example according to the invention, the Curie temperature is elevated and the resistivity at room temperature is considerably reduced. Furthermore, by separately carrying out the step of preparing the calcined powder of (BaQ)TiO$_3$ (Q is a semiconductive dopant) and the step of preparing the calcined powder of (BiNa)TiO$_3$, evaporation of Bi is inhibited, and the high Bi/Na ratio is obtained even after sintering, and therefore, formation of secondary phases is inhibited, the resistivity at room temperature is further reduced and the scattering in the Curie temperature is inhibited. Furthermore, in the examples, although there is shown a case of using La as R in the semiconductive dopant Q, even when other R element and M element are used, it is confirmed that a characteristic similar to that in the case of using La is achieved.

In contrast thereto, according to the semiconductor porcelain composition of the comparative examples, although the Curie temperature is elevated, the resistivity at room temperature is high, and also the temperature coefficient of resistivity is low. Furthermore, since a large amount of Bi is evaporated in the calcining step and the sintering step, Bi/Na ratio after sintering becomes equal to or smaller than 0.77. It is considered that an increase in the resistivity at room temperature is caused by the formation of secondary phases due to evaporation of Bi.

Example 3

BaCO$_3$ and TiO$_2$ as main raw materials, and a raw material powder of La$_2$O$_3$ as a semiconductive dopant were prepared and blended to satisfy (Ba$_{0.994}$La$_{0.006}$)TiO$_3$, and they were mixed in ethanol. The mixed raw material powder thus obtained was calcined at 1000° C. for 4 hours to prepare a calcined powder of (BaLa)TiO$_3$.

Raw material powders of NaCO$_3$, Bi$_2$O$_3$ and TiO$_2$ were prepared and blended to satisfy (Bi$_{0.5}$Na$_{0.5}$)TiO$_3$, and they were mixed in ethanol. The mixed raw material powder thus obtained was calcined at 600° C. for 4 hours to prepare a calcined powder of (BiNa)TiO$_3$.

The calcined powder of (BaLa)TiO$_3$ and the calcined powder of (BiNa)TiO$_3$ were blended to satisfy [(Bi$_{0.5}$Na$_{0.5}$)$_{0.1}$(Ba$_{0.994}$La$_{0.006}$)$_{0.9}$]TiO$_3$, and they were mixed, crushed, and then dried by a pot mill using ethanol as a medium until a mixed calcined powder became to have a size of 0.9 μm. The crushed powder of the mixed calcined powder was added and mixed with PVA and then granulated by the granulating apparatus. After the granulated powder thus obtained was formed by a uniaxial press apparatus and the green compact was removed of a binder at 500° C., sintering at sintering temperature of 1290° C., 1320° C., or 1350° C. for 4 hours was carried out to obtain a sintered body.

The sintered body thus obtained was worked into a shape of a plate having a size of 10 mm×10 mm×1 mm to produce a test piece, and temperature changes of resistance values of the respective test pieces in the range of from room temperature to 270° C. were measured by a resistance measuring instrument. The results of the measurement are shown in Table 4. Further, a content analysis of Bi and Na was carried out to calculate a ratio of Bi/Na. The results thereof are shown in Table 4.

Although Example 3 shows an example in which Si oxide and Ca carbonate or Ca oxide were not added in the steps, as is apparent in Table 4, it can be seen that characteristics substantially similar to those of the example of Example 2 in which the addition thereof was carried out can be achieved even without adding Si oxide and Ca carbonate or Ca oxide.

Example 4

BaCO$_3$ and TiO$_2$ as main raw materials, and a raw material powder of La$_2$O$_3$ as a semiconductive dopant were prepared and blended to satisfy (Ba$_{0.994}$La$_{0.006}$)TiO$_3$, and they were mixed in ethanol. The mixed raw material powder thus obtained was calcined at 1000° C. for 4 hours to prepare a calcined powder of (BaLa)TiO$_3$.

Raw material powders of NaCO$_3$, Bi$_2$O$_3$ and TiO$_2$ were prepared and blended to satisfy (Bi$_{0.5}$Na$_{0.5}$)TiO$_3$, and the resultant matters were mixed in ethanol. The mixed raw material powder thus obtained was calcined at 800° C. for 4 hours to prepare a calcined powder of (BiNa)TiO$_3$.

The calcined powder of (BaLa)TiO$_3$ and the calcined powder of (BiNa)TiO$_3$ were blended to satisfy [(Bi$_{0.5}$Na$_{0.5}$)$_{0.1}$(Ba$_{0.994}$La$_{0.006}$)$_{0.9}$]TiO$_3$, and then they were mixed, crushed, and then dried by a pot mill using ethanol as a medium until a mixed calcined powder became to have a size of 0.9 μm. The crushed powder of the mixed calcined powder was added and mixed with PVA and then granulated by the granulating apparatus. After the granulated powder thus obtained was formed by a uniaxial press apparatus and the green compact was removed of a binder at 500° C., sintering at sintering temperature for sintering period shown in Table 5 in a nitrogen atmosphere having an oxygen concentration of less than 1% was carried out to obtain a sintered body. Herein, 0 hr in the sintering period signifies that the sintering period exceeds 0 (zero) and is less than 1 hour.

The sintered body thus obtained was worked into a shape of a plate having a size of 10 mm×10 mm×1 mm to produce a test piece, and temperature changes of resistance values of the respective test pieces in the range of in a range of from room temperature to 270° C. were measured by a resistance measuring instrument. The results of measurement are shown in Table 5. Comparative examples are attached with * mark at a side of sample No. Sample No. 16 was made by subjecting sample No. 14 to a heat treatment at 1000° C. in air. Further, with regard to a sample of a sample No. 6, a content analysis of Bi and Na was carried out to calculate a ratio of Bi/Na. As a result, Bi/Na ratio was found to be 1.00.

Comparative Example 3

BaCO$_3$ and TiO$_2$ as main raw materials, La$_2$O$_3$ as a semiconductive dopant, and NaCO$_3$, Bi$_2$O$_3$ and TiO$_2$ as shifters of the Curie temperature were prepared, and all the elements constituting the composition were mixed before calcination (raw material blending stage) to satisfy [(Bi$_{0.5}$Na$_{0.5}$)$_{0.1}$(Ba$_{0.994}$La$_{0.006}$)$_{0.9}$]TiO$_3$, and they were mixed in ethanol. The mixed raw material powder thus obtained was calcined at 1000° C. for 4 hours in nitrogen to provide a calcined powder.

The calcined powder thus obtained was mixed, crushed, and then dried by a pot mill using ethanol as a medium until the mixed calcined powder became to have a size of 0.9 μm. A crushed powder of the mixed calcined powder was added and mixed with PVA, and then granulated by the granulating apparatus. After the granulated powder thus obtained was formed by a uniaxial press apparatus and the green compact was removed of a binder at 500° C., sintering at 1320° C. for 3 hours in the nitrogen atmosphere having an oxygen concentration of less than 1% was carried out to obtain a sintered body. The sintered body thus obtained was worked into a shape of a plate having a size of 10 mm×10 mm×1 mm to produce a test piece, and temperature changes of resistance values of the respective test pieces in the range of from room temperature to 270° C. were measured by a resistance measuring instrument. The results of measurement are as follows:

ρ30 (Ωcm)=602, Tc (° C.)=154, and temperature coefficient of resistivity (%/° C.)=12. Further, a content analysis of Bi and Na of the sintered body was carried out to calculate a ratio of Bi/Na, and as a result, Bi/Na ratio was found to be 0.76.

As is apparent from the results in Table 5, by carrying out the sintering step at sintering temperature of 1290° C. through 1350° C. for sintering period of less than 4 hours in an atmosphere having an oxygen concentration of less than 1%, the temperature coefficient of resistivity at a high temperature region (equal to or higher than the Curie temperature) can be promoted while maintaining the room temperature resistivity to be low. Furthermore, a scattering in the temperature coefficient of resistivity can also be inhibited.

From the results of Example 4 and Comparative Example 3, by separately carrying out the step of preparing the calcined powder of (BaLa)TiO$_3$ and the step of preparing the calcined powder of (BiNa)TiO$_3$, the Curie temperature is elevated and the resistivity at room temperature can considerably be reduced. Further, since the evaporation of Bi is inhibited and the high Bi/Na ratio is provided even after sintering, formation of secondary phases is inhibited, the resistivity at room temperature is reduced, and the scattering in the Curie temperature is inhibited. It can be seen that according to the semiconductor porcelain composition of Comparative Example 3, since a large amount of Bi is evaporated, secondary phases are generated, and as a result, the resistivity at room temperature is increased.

Example 5

The calcined powder of (BiLa)TiO$_3$ and the calcined powder of (BiNa)TiO$_3$ obtained by Example 4 were blended to satisfy $[(Bi_{0.5}Na_{0.5})_{0.1}(Ba_{0.994}La_{0.006})_{0.9}]TiO_3$, and they were mixed, crushed, and then dried by a pot mill using ethanol as a medium until a mixed calcined powder became to have a size of 0.9 μm. A crushed powder of the mixed calcined powder was added and mixed with PVA and then granulated by the granulating apparatus. After the granulated powder thus obtained was formed by a uniaxial press apparatus and the green compact was removed of a binder at 500° C., sintering at sintering temperatures for sintering period shown in Table 2 in a nitrogen atmosphere having an oxygen concentration of less than 1% was carried out, followed by cooling at the cooling rate shown in Table 6 to thereby obtain a sintered body. Herein, "quench" at the cooling rate of Table 6 was brought about by a rapid cooling in which the cooling rate exceeded 550° C./hr.

The sintered body thus obtained was worked into a shape of a plate having a size of 10 mm×10 mm×1 mm to produce a test piece, and temperature changes of resistance values of the respective test pieces in the range of from room temperature to 270° C. were measured by a resistance measuring instrument. The results of measurement are shown in Table 6. Comparative examples are attached with * mark at a side of sample No..

As is apparent from the results shown in Table 6, by executing a sintering step at sintering temperature of 1290° C. through 1350° C. for sintering period satisfying equation: ΔT≥25 t (t=sintering time (hr), ΔT=cooling rate after sintering (° C./hr)) and successively executing a cooling after sintering at the cooling rate satisfying the above equation, the temperature coefficient of resistivity at a high temperature region (equal to or higher than the Curie temperature) can be promoted while maintaining the room temperature resistivity to be low. Further, the scattering in the temperature coefficient of resistivity can also be inhibited.

Herein, in all the examples, the temperature coefficient of resistivity was calculated by the following equation.

$$TCR=(\ln R1-\ln Rc\times100/(T1-Tc)$$

In this regard, notation R1 designates a maximum resistivity, notation Rc designates a resistivity at Tc, notation T1 designates a temperature showing R1, and notation Tc designates the Curie temperature.

TABLE 1

| | No. | calcination temperature | Na amount | Bi amount | mixing method |
|---|---|---|---|---|---|
| Example 1 | 1 | 600° C. | 100 | 97.3 | wet type |
| | 2 | 650° C. | 100 | 97.0 | wet type |
| | 3 | 700° C. | 100 | 96.9 | wet type |
| | 4 | 750° C. | 100 | 96.9 | wet type |
| | 5 | 800° C. | 100 | 97.4 | wet type |
| | 6 | 800° C. | 100 | 98.4 | dry type |
| | 7 | 850° C. | 100 | 97.3 | wet type |
| | 8 | 900° C. | 100 | 97.6 | wet type |
| Comparative Example 1 | 9 | 900° C. | 100 | 89.0 | wet type |
| | 10 | 1000° C. | 100 | 89.0 | wet type |
| | 11 | 1100° C. | 100 | 87.4 | wet type |
| | 12 | 1200° C. | 100 | 86.9 | wet type |

TABLE 2

| sample No. | calcination temperature (° C.) of (BiNa)TiO$_3$ | sintering temperature (° C.) | Bi/Na ratio (x) | ρ30 (Ωcm) | Tc (° C.) | temperature coefficient of resistivity (%/° C.) |
|---|---|---|---|---|---|---|
| 1 | 800 | 1350 | 0.84 | 128 | 161 | 20.2 |
| 2 | 800 | 1320 | 0.84 | 67 | 161 | 14.1 |
| 3 | 800 | 1290 | 0.86 | 122 | 156 | 19 |
| 4 | 800 | 1350 | 0.92 | 86 | 162 | 13.8 |
| 5 | 800 | 1350 | 0.99 | 101 | 157 | 19.4 |
| 6 | 800 | 1350 | 0.88 | 72 | 160 | 14.3 |
| 7 | 700 | 1350 | 0.87 | 94 | 157 | 18.2 |
| 8 | 950 | 1350 | 0.83 | 98 | 156 | 14.2 |
| 9* | 650 | 1350 | 0.8 | 912 | 146 | 21.2 |
| 10* | 1000 | 1350 | 0.75 | 823 | 145 | 21.7 |
| 11* | 800 | 1350 | 1.02 | 386 | 159 | 18.8 |

TABLE 3

| No. | calcination temperature (° C.) | sintering temperature (° C.) | Bi/Na ratio (x) | ρ30 (Ωcm) | Tc (° C.) | temperature coefficient of resistivity (%/° C.) |
|---|---|---|---|---|---|---|
| 1* | 1000 | 1350 | 0.77 | 834.6 | 151 | 13 |
| 2* | 1000 | 1320 | 0.77 | 602.1 | 154 | 12 |
| 3* | 1000 | 1290 | 0.76 | 593.3 | 156 | 12 |

TABLE 4

| No. | BNT calcination temperature (° C.) | sintering temperature (° C.) | Bi/Na ratio (x) | ρ30 (Ωcm) | Tc (° C.) | temperature coefficient of resistivity (%/° C.) |
|---|---|---|---|---|---|---|
| 1 | 800 | 1350 | 0.92 | 115 | 158 | 18.2 |
| 2 | 800 | 1320 | 0.96 | 94 | 161 | 17.1 |
| 3 | 800 | 1290 | 0.96 | 99 | 162 | 16.9 |

TABLE 5

| sample No. | sintering temperature (° C.) | sintering period (hr) | ρ30 (Ωcm) | Tc (° C.) | temperature coefficient of resistivity (%/° C.) |
|---|---|---|---|---|---|
| 1 | 1290 | 0 | 91.3 | 161 | 14.8 |
| 2 | 1290 | 1 | 87.9 | 159 | 14.6 |
| 3 | 1290 | 3 | 88.2 | 158 | 14.4 |
| 4 | 1320 | 0 | 86.6 | 155 | 13.3 |
| 5 | 1320 | 1 | 81.7 | 157 | 13.6 |
| 6 | 1320 | 3 | 79.3 | 156 | 14.6 |
| 7 | 1350 | 0 | 79.7 | 157 | 14.5 |
| 8 | 1350 | 1 | 78.4 | 156 | 14.2 |
| 9 | 1350 | 3 | 77.5 | 160 | 14.4 |
| 10* | 1320 | 8 | 99.4 | 152 | 10.5 |
| 11* | 1280 | 1 | 120.6 | 145 | 18.7 |
| 12* | 1360 | 1 | 58.2 | 163 | 9.8 |
| 13* | 1290 | 10 | 41.1 | 165 | 4.3 |
| 14* | 1320 | 10 | 34.9 | 166 | 4.2 |
| 15* | 1360 | 10 | 32.8 | 167 | 4.1 |
| 16* | | | 260 | 148 | 13.6 |

TABLE 6

| sample No. | sintering temperature (° C.) | sintering period (hr) | cooling rate (° C./hr) | ρ30 (Ωcm) | Tc (° C.) | temperature coefficient of resistivity (%/° C.) |
|---|---|---|---|---|---|---|
| 17* | 1320 | 4 | 10 | 66.3 | 167 | 11.8 |
| 18* | 1320 | 4 | 25 | 74.1 | 159 | 12.5 |
| 19* | 1320 | 4 | 50 | 73.7 | 156 | 12.9 |
| 20 | 1320 | 4 | 100 | 79.3 | 152 | 14.1 |
| 21 | 1320 | 4 | 150 | 81.2 | 154 | 14.4 |
| 22 | 1320 | 4 | 250 | 81.3 | 157 | 14.6 |
| 23 | 1320 | 4 | 350 | 79.1 | 156 | 14.9 |
| 24 | 1320 | 4 | 450 | 79.9 | 155 | 14.5 |
| 25 | 1320 | 4 | 550 | 78.9 | 154 | 14.2 |
| 26 | 1320 | 4 | quench | 86.6 | 152 | 14.4 |
| 27* | 1320 | 10 | 150 | 30.7 | 215 | 4.1 |
| 28 | 1320 | 8 | 250 | 68.7 | 157 | 14.3 |
| 29 | 1320 | 1 | 25 | 77.7 | 154 | 14.4 |
| 30* | 1260 | 4 | 150 | 181.3 | 144 | 15.6 |
| 31 | 1290 | 4 | 150 | 75.1 | 156 | 14.6 |
| 32 | 1350 | 4 | 150 | 79.9 | 153 | 14.5 |
| 33 | 1380 | 4 | 150 | 48.9 | 164 | 11.6 |

Industrial Applicability

The semiconductor porcelain composition according to the invention is optimum as a material for a PTC thermistor, a PTC heater, a PTC switch, a temperature detector or the like.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A semiconductor porcelain composition obtained by forming and sintering, without further heat treatment, a mixed calcined powder of a calcined powder of $(BaR)TiO_3$ (wherein R is a semiconductive dopant and is at least one kind selected from La, Dy, Eu, Gd and Y) and a calcined powder of $(BiNa)TiO_3$, wherein the semiconductor porcelain composition has a composition formula expressed as $[(BiNa)_x(Ba_{1-y}R_y)_{1-x}]TiO_3$, wherein x and y each satisfy $0<x\leq0.2$ and $0.006\leq y\leq0.02$; and wherein the ratio of Bi to Na satisfies the relationship of Bi/Na = 0.78 through 1.

* * * * *